A. SCHLOEMER.
AGRICULTURAL IMPLEMENT.
APPLICATION FILED MAR. 20, 1911.
1,019,370.
Patented Mar. 5, 1912.
3 SHEETS—SHEET 3.
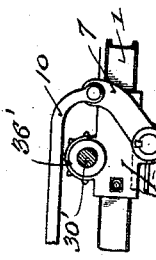
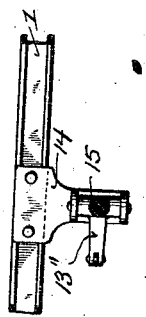
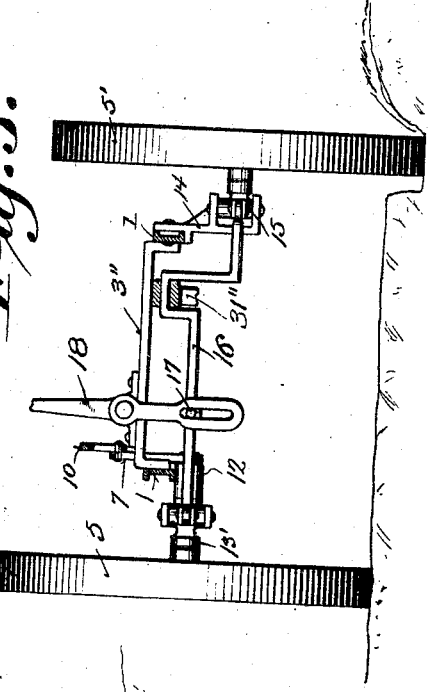
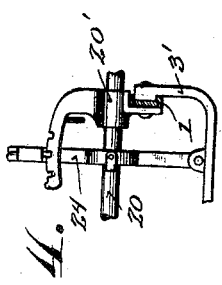
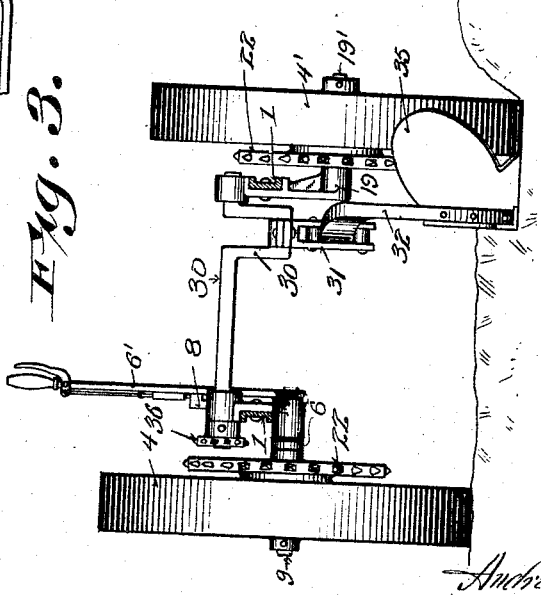

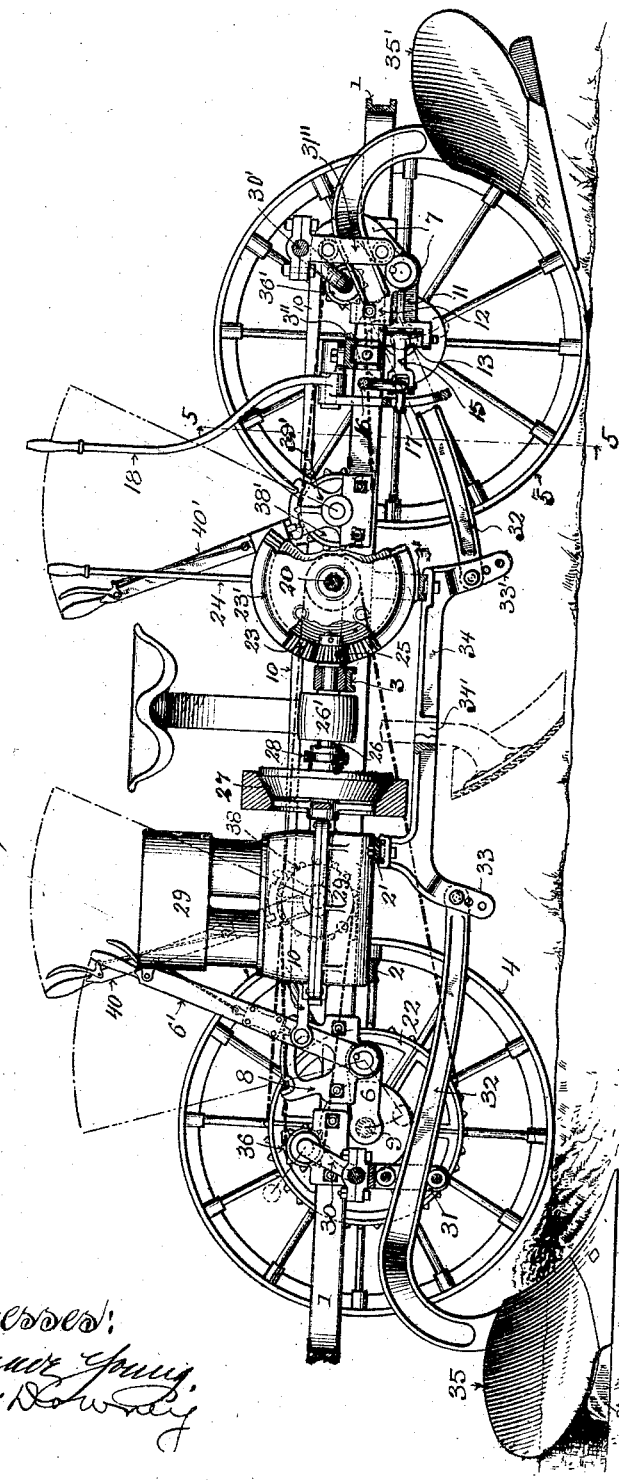

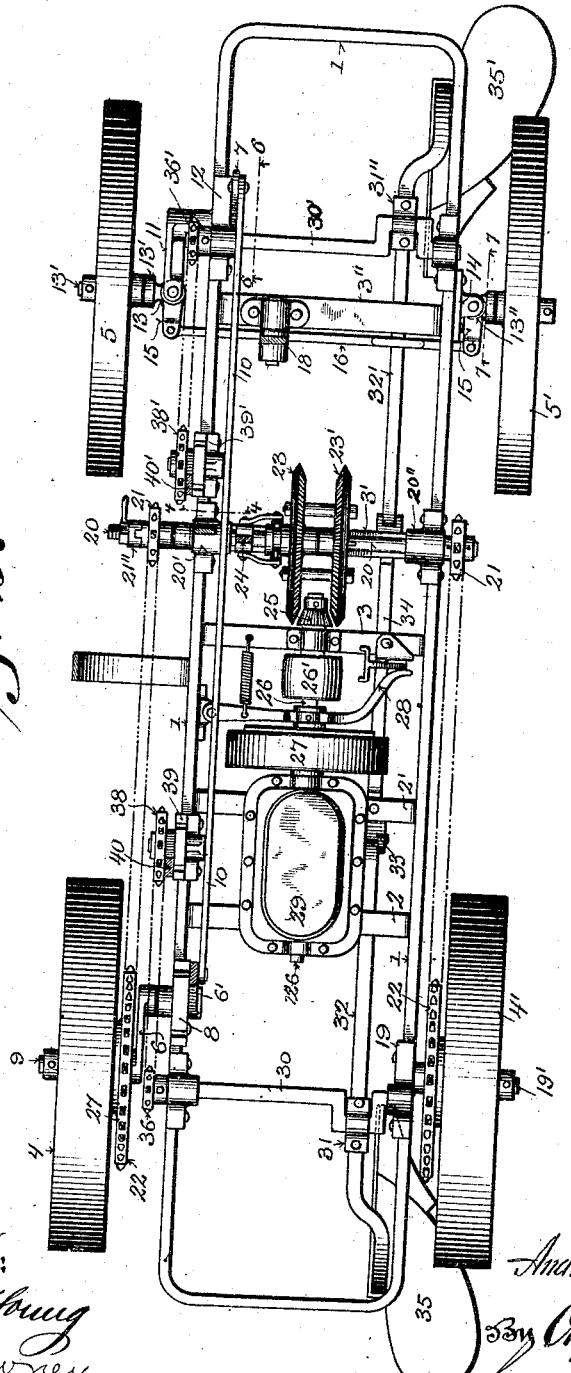

UNITED STATES PATENT OFFICE.

ANDREW SCHLOEMER, OF WEST ALLIS, WISCONSIN.

AGRICULTURAL IMPLEMENT.

1,019,370.  Specification of Letters Patent.  Patented Mar. 5, 1912.

Application filed March 20, 1911. Serial No. 615,565.

*To all whom it may concern:*

Be it known that I, ANDREW SCHLOEMER, a citizen of the United States, and resident of West Allis, in the county of Milwaukee and State of Wisconsin, have invented certain new and useful Improvements in Agricultural Implements; and I do hereby declare that the following is a full, clear, and exact description thereof.

The object of my invention is to provide a simple, economical truck-supported plow of the double end variety whereby turning at the end of a furrow is eliminated resulting in a material increase of work performed in a given time, the truck being self-propelled. The construction and arrangement of the plow is such that a pair of plows of any type have their oppositely disposed draft ends fulcrumed to a centrally disposed reach carried by the frame, the plow-beams being independently raised and lowered by crank-shafts which are connected to the beams by hangers that are in slidable engagement with said beams, the crank-shafts being actuated by lever-controlled chain and sprocket gears whereby the raising and lowering of the same are facilitated.

With the above object in view my invention consists in what is herein shown, described and claimed.

In the drawings Figure 1 represents a longitudinal sectional elevation of a machine embodying the features of my invention, looking toward the land side; Fig. 2, a plan view of the same with parts broken away and in section; Fig. 3, a transverse sectional view of the machine, the section being taken across the machine at approximately the point of the crank-shaft constituting the raising and lowering mechanism looking from the rear, said machine being shown in its working position with the furrow wheels seated within the last furrow cut, the plow which follows the traction wheels being shown in its working position and arranged to fold the slice into the last furrow cut just rearward of the furrow wheel; Fig. 4, a detail cross-section as indicated by line 4—4 of Fig. 2, the section illustrating the counter-shaft and reverse mechanism; Fig. 5, a detailed cross-sectional view of the machine, the plane of the section being generally indicated by line 5—5 of Fig. 1, said view showing the steering mechanism and its connected parts with the plow-beam removed and its hanger connection to the crank-shaft broken away and in section; Fig. 6, a detailed sectional view of the adjusting mechanism for the land side steering wheel, as indicated by line 6—6 of Fig. 2, and Fig. 7, a detailed sectional view of the furrow side steering wheel frame connection the section being indicated by line 7—7 of Fig. 2.

Referring by characters to the drawings, 1 represents a rectangular truck frame provided with cross girders 2, 2', and 3, 3', which frame is supported by a pair of traction wheels 4, 4', and a pair of steering wheels 5, 5'. In practice it is desired to make provision for adjusting the wheels at the land side of the machine in order to maintain the same upon a level in its road-traversing and working position and with this in view the traction and steering wheels upon the land side of the machine are shown carried by adjustable elbow levers 6 and 7 respectively, the elbow lever 6 being fulcrumed to a bracket 8 that is secured to the adjacent side-bar of the truck-frame. One arm of the elbow lever carries a stud 9, upon which is loosely mounted the traction wheel 4, while the opposite arm 6' extends upwardly and forms a hand-lever having the usual locking detent that engages notches in a sector extension of the bracket.

The elbow lever arm 6' is connected by a link 10 to one arm of the second elbow lever 7 that is fulcrumed in a bracket 12, which bracket is secured to the side bar of a truck frame at the steering wheel end thereof. The other arm 11 of lever 7 terminates with spanner ears, between which ears is fulcrumed a knuckle 13 having a stud 13' upon which is journaled the steering wheel 5, the knuckle being always maintained in an approximately vertical plane, whereby the steering wheel is prevented from buckling. Thus when lever-arm 6' is manipulated, the connected land side wheels may be raised or lowered to their working or road-traveling positions, it being understood, as shown in Fig. 3, that the furrow-wheels travel in the last furrow cut and are therefore upon a lower plane than the land side wheels, the plow being offset from said furrow wheels a distance equal to the width of cut, whereby the slice is folded over into the last furrow cut rearwardly of the traction or steering wheel depending upon the direction of travel of the machine.

A knuckle 13″ similar to that just described in connection with the adjustable steering wheel is provided for the land side steering wheel, which knuckle is rigidly swiveled between ears of a bracket 14 that is secured to the truck-frame.

Arms 15, 15′, of the knuckles 13 and 13″ are connected by a link 16, which link is provided with a stud 17 that engages the slotted end of the steering lever 18, the loose connection between the link and steering lever being provided to permit the land side wheel to be raised and lowered without disconnecting said steering mechanism from the steering lever, it being understood, as shown in Fig. 1, that the steering lever is fulcrumed to a stud carried by the cross-girder 3″: By this arrangement it is apparent that the steering lever being under hand-control the machine may be guided by moving the same one way or the other, whereby the knuckles carrying the steering wheels will be deflected accordingly. The furrow side traction wheel is rigidly connected to the frame by means of a bracket 19, which bracket carries a stud-axle 19′, the land side wheel being mounted thereon.

Power is imparted to the traction-wheels from an engine 29 to a counter-shaft 20 through reverse bevel gear-wheels 23, 23′ carried thereby and adapted to mesh with a pinion 25 on the engine shaft 26, the beveled gear-wheels being shifted by clutch mechanism 24. The counter-shaft 20 carries sprocket-wheels 21 that are in link belt connection with sprocket-wheels 22 of said traction wheels, and under control of a clutch 21″ that is mounted upon said counter-shaft all of which construction forms no part of my invention, it being understood that the engine is also provided with the usual clutch mechanism 26″ under control of a lever 28 and that the counter-shaft is journaled in bearings 20′, 20″, that are secured to the side bars of the frame.

A transversely disposed crank-shaft 30 is journaled in bearings carried by the truck-frame in juxtaposition to the traction-wheel, from the crank portion of which shaft is suspended a hanger 31 provided with a pair of spaced anti-friction rollers, for the support of and between which a plow beam 32 extends, the same having sliding engagement with said hanger, the draft end of the plow-beam is hinged between members of a strap 33, which strap forms part of a reach 34, the reach being rigidly secured to the cross-girders 2′ and 3, as best shown in Fig. 1. The plow-beam carries any desired type of plow 35, which plow is disposed just rearwardly of the furrow traction wheel being offset inwardly therefrom and when in its working position, folds the soil slice into the last furrow cut following said traction wheel, it being understood that this plow is of the right hand variety. The plow is held in its working position by the crank-shaft and hanger 31 and is raised and lowered by a partial rotation of said crank-shaft, which rotation is imparted thereto by a small sprocket-wheel 36 that is fast upon one end of said shaft and in belt-gear connection with a larger sprocket-wheel 38, the latter being secured upon a stud that is journaled in a bracket 39 having a projecting toothed sector for engagement with a detent carried by a hand-lever 40. By this gear connection between the crank-shaft and hand-lever, a slight movement of the same will be sufficient to raise or lower the plow to its working or carrying position the same being locked in either position by the detent. Owing to the sliding connection between the hanger and plow-beam it is apparent that the point of lift varies and when said plows are raised the hangers move rearward or toward the plows and away from the fulcrum point of the beam, hence the power to lift the load is reduced and at the same time more or less freedom of movement of the plow is had when held in its working position.

In order to regulate the draft of the plow and depth of the furrow to be cut, the strap 33 is provided with a series of apertures whereby the hinge connection between said strap and draft end of the plow-beam may be adjusted to different elevations, and while I have made provision for only locking the plow in its extreme lower position, it is apparent that the depth of the cut of said plow may be varied by providing a series of notches in the sector of bracket 39 for engagement with the hand-lever detent.

A crank-shaft 30′ similar to the crank 30 just described is journaled in bearings in juxtaposition to the steering wheels. This crank-shaft carries a hanger 31″ and plow-beam 32′ with its accompanying plow 35′, the plow-beam being connected to a strap 33′ of the reach 34. The crank-shaft 30′ is raised and lowered in a similar manner to that described in connection with the crank-shaft 30 having a small sprocket-wheel 36′, that is in link-belt connection with a larger sprocket-wheel 38′ under control of a hand-lever 40′. Thus it will be understood that this plow can be raised or lowered independent of the oppositely disposed plow 35, the plow 35′ being of the left-hand variety.

Attention is called to the fact that the sprocket-wheels 36, 36′, are secured to ends of the shafts 30, 30′, and the crank portions are formed upon the opposite ends of said shafts. Hence the relative positions of the cranks and sprocket-wheels serve to balance the load, the weight of the plows being arranged upon ends of these crank-shafts while the lifting power is applied through the sprocket-wheels upon the opposite ends of said shafts.

From the foregoing description with reference to Fig. 1, it will be seen that when the machine is running in the direction indicated to perform its function as a plow that it is not necessary to turn the same at the end of a furrow, but the plow 35 can be raised by the driver from his seated position upon the machine and the plow 35' is then lowered to its working position, the shift-lever 24 being then reversed, the machine will start backward upon its next cut, thus economizing time and eliminating the inconvenience in turning and manipulating the plow so as to aline the same for the next plowing operation. Furthermore it should be understood that, while the length of the machine will prevent the operator from plowing up to a road or fence that this space is thereafter plowed at a right angle to the furrows cut in the remainder of the field.

While I have shown the machine as being equipped with single plows with their points toward each other, it is obvious that a gang of such plows at either end of the machine may be attached thereto and that for the same, any other form of agricultural implements such as a cultivator or the like may be used, and, as indicated by dotted lines in Fig. 1, the reach 34 is provided with a socket 34' for the reception of a suitable road scraper blade which may be adjustably connected thereto, it being understood that the blade should be disposed at an angle to the draft.

I claim:

A plow comprising a truck, cross-girders carried by the truck, a centrally disposed reach connecting the cross-girders, oppositely disposed plow-beams having their draft ends hinged to the reach, the plow-beams being in juxtaposition to the furrow side of the truck, a right hand plow carried by one plow-beam and a left-hand plow carried by the opposite plow-beam, crank-shafts journaled at opposite ends of the truck-frame, the crank portion of said shafts being in juxtaposition to the furrow side of the truck, hangers suspended from the cranked portion of said crank-shafts, upper and lower anti-friction rollers carried by the hangers for sliding engagement with the plow-beams, independent hand-levers mounted upon the frame, means for locking the hand levers in different positions, a gear-wheel connected to each hand lever, a gear-wheel connected to each crank-shaft in juxtaposition to the land side of said truck, and link-belts connecting the pairs of gear-wheels whereby independent adjustment of the plows may be had through their respective crank-shafts.

In testimony that I claim the foregoing I have hereunto set my hand at Milwaukee in the county of Milwaukee and State of Wisconsin in the presence of two witnesses.

ANDREW SCHLOEMER.

Witnesses:
GEO. W. YOUNG,
MAY DOWNEY.

---

Copies of this patent may be obtained for five cents each, by addressing the "Commissioner of Patents, Washington, D. C."